Dec. 10, 1957 — R. T. COFFMAN — 2,815,968

SEAL FOR ROTATING SHAFT

Filed Jan. 11, 1956 — 2 Sheets-Sheet 1

INVENTOR.
Raphael T. Coffman
BY
Roland A. Anderson
Attorney

Dec. 10, 1957 R. T. COFFMAN 2,815,968
SEAL FOR ROTATING SHAFT
Filed Jan. 11, 1956 2 Sheets-Sheet 2

INVENTOR.
Raphael T. Coffman
BY
Roland A. Anderson
Attorney

United States Patent Office 2,815,968
Patented Dec. 10, 1957

2,815,968

SEAL FOR ROTATING SHAFT

Raphael T. Coffman, Richland, Wash., assignor to the United States of America as represented by the United States Atomic Energy Commission Application January 11, 1956, Serial No. 558,600

2 Claims. (Cl. 286—11.11)

This invention relates to a seal and, more particularly, to a seal for a rotating shaft.

The seal of the present invention is applicable to a shaft for an agitator or stirrer in a container into which a vacuum is employed to draw a liquid to be agitated or stirred that is poisonous, corrosive, or radioactive. While the liquid is being brought in by a vacuum, the sealing at the agitator shaft must be very good, whereas when the agitator shaft is being rotated to stir up the liquid, liquid is not being brought in, a high degree of vacuum is not required, and the sealing need be less effective.

The shaft seal of the present invention is highly effective when the shaft is not being rotated and is less effective when the shaft is being rotated. According to the present invention, weights distributed about a sealing disk secured to a shaft press the sealing disk against a tubular section into which the shaft extends, and when the shaft rotates, the centrifugal forces on the weights relieve the pressure of the sealing disk against the tubular section. This action has the very desirable result of minimizing the wear of the rotating disk due to contact with the tubular section.

Figure 1:
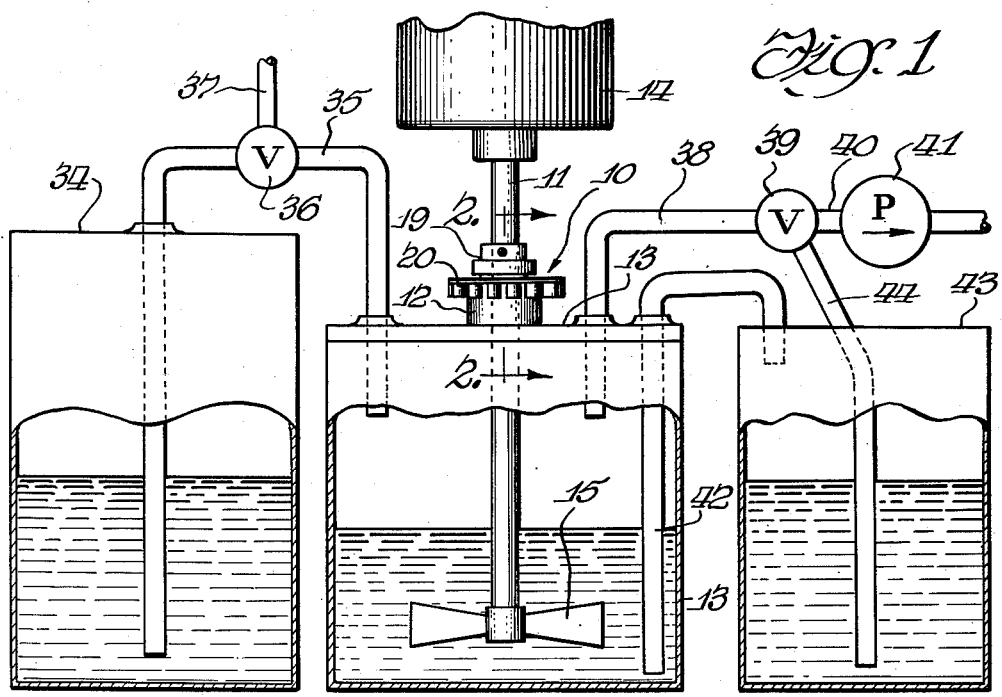
Fig. 1 is a diagrammatic view, partly in elevation and section, of the novel seal of the present invention and the apparatus with which it is used.

As shown in Fig. 1, a seal 10 of the present invention is applied between a vertical shaft 11 and a short tubular section 12 through which the shaft enters a container 13. The shaft is driven by a motor 14 which is positioned above the container 13 and drives an agitator or stirrer 15 located in the container 13. The tubular section 12 is secured at an opening on the container 13 by soldering or welding.

Figure 2:
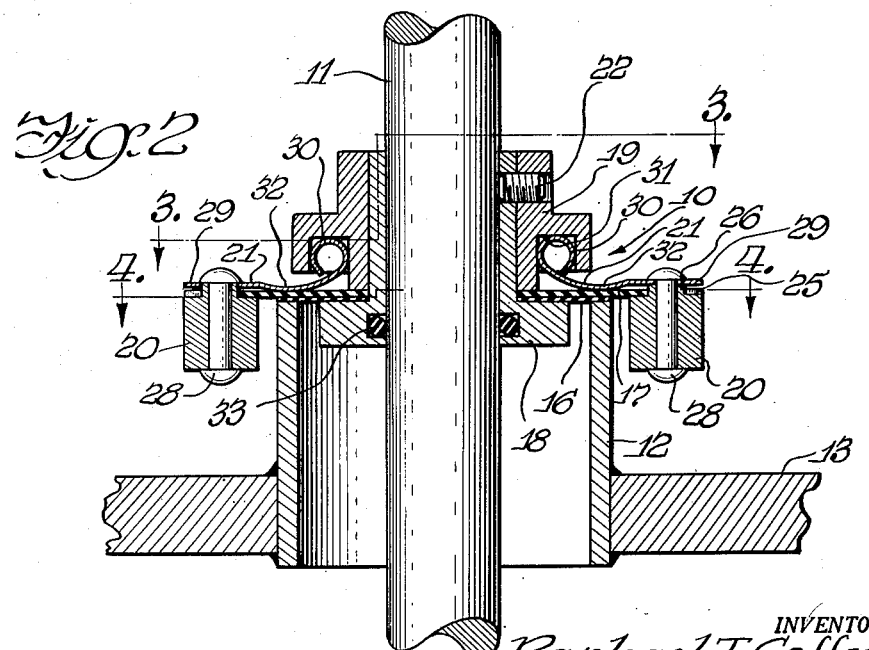
Fig. 2 is a sectional view taken on the line 2—2 of Fig. 1.
Figure 3:
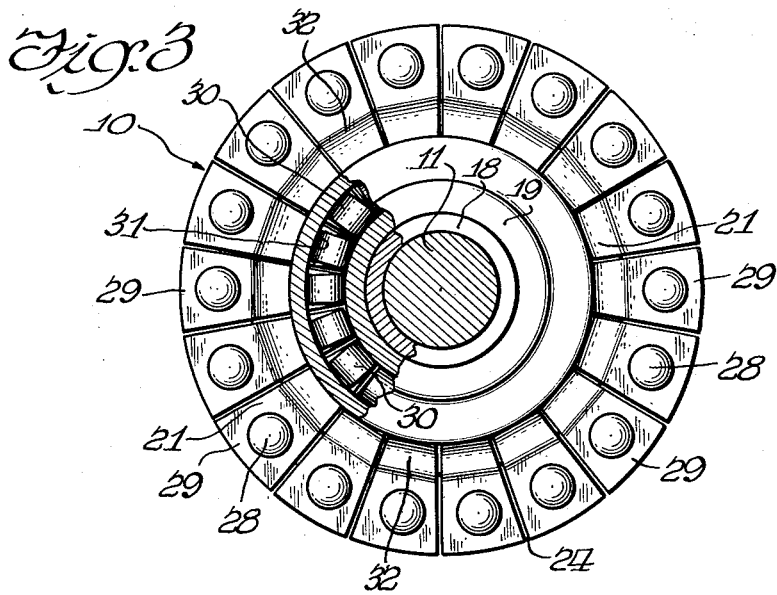
Fig. 3 is a horizontal sectional view taken on the line 3—3 of Fig. 2.
Figure 4:
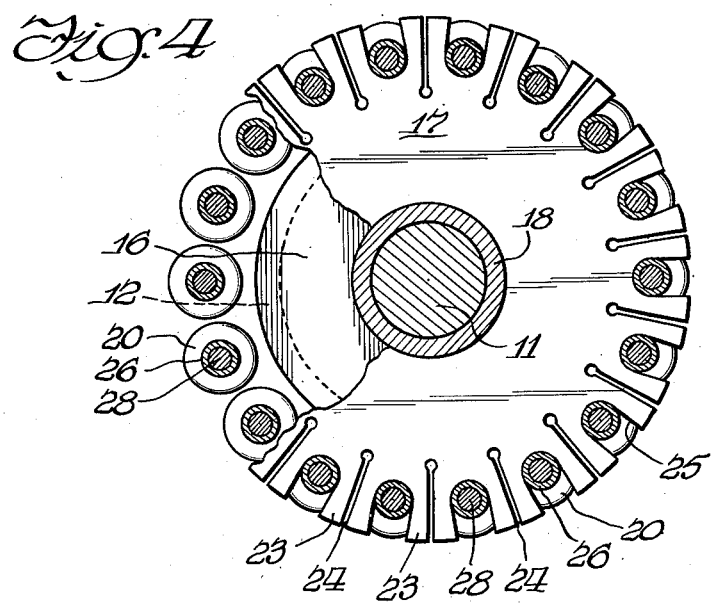
Fig. 4 is a horizontal sectional view taken on the line 4—4 of Fig. 2.

As shown in Fig. 2, the seal 10 comprises an annular sealing disk 16, an annular pressure disk 17, a collar 18, a holder 19, a plurality of weights 20, and a plurality of resilient retaining elements 21. The sealing disk 16 is formed of a sealing material inert to corrosive substances if the liquid to be agitated in the container is a corrosive substance, which sealing material may be a polymerized fluoro-hydrocarbon. The pressure disk 17 may be formed of the same material as the sealing disk 16. The other parts of the seal 10, as well as the shaft 11, tubular section 12, container 13, and agitator 15, may be formed of stainless steel. The sealing disk 16 engages the upper end of the tubular section 12 and has the same outer diameter as the tubular section 12. The pressure disk 17 lies on the sealing disk 16, and the radially inner portions of the two disks are clamped between the collar 18 and the holder 19, which are secured to one another and to the shaft 11 by a set screw 22 and thus secure the two disks to the shaft 11 for rotation therewith.

The pressure disk 17 has a portion that extends radially outward of the sealing disk 16 and is formed into a plurality of scallops or segments 23 which are distributed all around the periphery of the pressure disk 17 and are spaced from one another by relatively narrow radial slits 24. Each scallop 23 has a relatively narrow radial slot 25 which extends inwardly from the outer edge and accommodates a reduced neck 26 on one of the weights 20. The weights 20 are distributed about the upper end of the tubular section 12, one weight to each scallop 23, and each weight 20 is secured by a rivet 28 to a radially outer end 29 of one of the retaining elements 21, which has a radially inner end 30 formed as a loop, which is lodged in an annular groove 31 formed in the holder 19. There is a plurality of retaining elements 21, one for each weight 20, and they are distributed about the holder 19. Each retaining element 21 is shaped or bent in such a way that an intermediate portion 32 thereof presses against a region of the pressure disk 17 directly over the upper end of the tubular section 12. The outer end 29 of each retaining element is spaced somewhat from the upper face of the associated scallop, this being possible because the neck 26 on the associated weight 20 is longer than the pressure disk 17 is thick. Since the weights 20 act downwardly against the outer ends 29 of the retaining elements 21, the inner ends 30 thereof are urged upwardly in the groove 31 in the holder 19, the intermediate portions 32 of the retaining elements 21 serving as fulcrums. The weights 20, acting through the intermediate portions 32 of the retaining elements 21, cause the pressure disk 17 to press the sealing disk 16 against the upper end of the tubular section 12. Thus, when the shaft 11 is not rotating, there is very good sealing produced between these parts. A ring 33, which is positioned in a groove in the collar 18, forms a seal between the shaft 11 and the collar 18. The ring 33 can be formed of a synthetic rubber consisting of the polymerization product of 2-chloro-butadiene-1,3.

When the shaft 11 is rotating, the centrifugal forces on the weights 20 cause them to move upwards toward the level of the inner ends 30 of the retaining elements 21, by which they are connected to the holder 19 and, in turn, to the shaft 11. As the weights 20 move upward, they move upward the scallops 23, with which they are connected, and so relieve the pressure of the pressure disk 17 against the sealing disk 16. Thus the pressure between the sealing disk 16 and the upper end of the tubular section 12 is reduced or eliminated, and the wear of the sealing disk 16 due to sliding on the tubular section 12 is reduced.

Thus with the novel seal 10 just described sealing action is at a maximum when the shaft 11 is not rotating and is appreciably reduced when the shaft is rotating. The seal 10 is advantageously used with the apparatus shown in Fig. 1. The container 13 is connected with a container 34 by a line 35 which extends from a region near the bottom of the container 34 to a region near the top of the container 13. The line 35 has a valve 36 which is connectable with a vent 37. A line 38 leads from a region near the top of the container 13 to a valve 39, from which a line 40 leads to a vacuum pump 41. A line 42 leads from a region near the bottom of the container 13 to a region near the top of a container 43. A line 44 leads from a region near the top of the container 43 to the valve 39.

When liquid is to be brought from the container 34 to the container 13 in order to be stirred or agitated, the valve 39 is adjusted to connect the lines 38 and 40 with one another and to block the line 44 and the valve 36 is adjusted to shut off the vent 37. Now operation of the vacuum pump 41 will suck the liquid from the container 34 through the line 35 to the container 13. At this time a good sealing action must be, and is, obtained between the seal 10 and the tubular section 12 on the container 13, because the shaft 11 is not rotated and the weights 20 cause the sealing disk 16 to be pressed firmly against the tubular section 12. When sufficient liquid has been brought into the container 13, the vacuum pump 41 is shut off or the line 38 is blocked by the valve 39 while the line 44 continues to be blocked. The motor 14 is now turned on to rotate the shaft 11 and the agitator 15, which agitates the liquid in the container 13. As previously described, the rotation of the shaft 11 causes the weights 20 to relieve the pressure of the pressure disk 17 on the sealing disk 16, with the result that the sealing disk 16 is not pressed hard against the tubular section 12. There is no objection to the loss in vacuum due to the reduction or elimination of pressure between the sealing disk 16 and the tubular section, because at this time vacuum is not being used to bring fluid in or out of the container 13. When the liquid in the container 13 has been agitated sufficiently, the motor 14 is shut off, and the shaft 11 stops rotating. Since centrifugal forces no longer act on the weights 20, they are now influenced only by gravity and so press the sealing disk 16 hard against the tubular section 12, producing efficient sealing here. The liquid in the container 13 may be transferred to the container 43 through the line 42. The valve 39 is adjusted to connect the line 44 with the line 40 and the vacuum pump 41 and to block the line 38. The valve 36 is adjusted to connect the line 35 to the vent 37. Now the vacuum applied by the pump 41 to the container 43 sucks the fluid in the container 13 through the line 42 into the container 43.

The intention is to limit the invention only within the scope of the appended claims.

What is claimed is:

1. A seal for a vertical rotating shaft operating at the upper end of a tubular section into which the shaft projects, said seal comprising an annular sealing disk engageable with the upper end of the tubular section, an annular pressure disk lying on the sealing disk and having a greater outer diameter than the sealing disk so as to extend radially outwardly thereof, the pressure disk having in the portion radially outward of the sealing disk a series of scallops distributed around the pressure disk, each scallop having a slot extending radially inwardly from its outer edge, a plurality of weights distributed about the tubular section at its upper end, one weight at each scallop, each weight having at one end a reduced neck extending through a slot in a scallop of the second disk and being longer than the scallop is thick, a collar secured to the shaft, a holder secured to the collar, the collar and holder clamping between them the annular disks at their radially inner portions, the holder having an annular groove, a plurality of springlike retaining elements one for each weight, each retaining element having a radially outer end secured to the end of the reduced neck of a weight and a radially inner end formed as a loop inserted in the annular groove in the holder, each retaining element further having an intermediate portion engaging the pressure disk at a region generally over the upper end of the tubular section.

2. A seal for a rotating shaft operating at the upper end of a tubular section into which the shaft projects, said seal comprising an annular sealing disk secured to the shaft for rotation therewith and being constantly in contact with said one end of the tubular section, a plurality of weights distributed about the periphery of the disk, and means connecting the weights to the shaft, the connecting means pressing the disk against the said one end of the tubular section when the shaft is at rest, the pressure of the connecting means on the disk being relieved when the shaft is in rotation thereby permitting a light contact to prevail between the disk and the said one end of the tubular section.

References Cited in the file of this patent

UNITED STATES PATENTS 2,140,356     Gutmann _____ Dec. 13, 1938

FOREIGN PATENTS 482,858     Germany _____ Mar. 14, 1930